April 30, 1935.  W. LUXMORE  1,999,542
DRINK MIXER
Filed Oct. 21, 1932   7 Sheets—Sheet 2

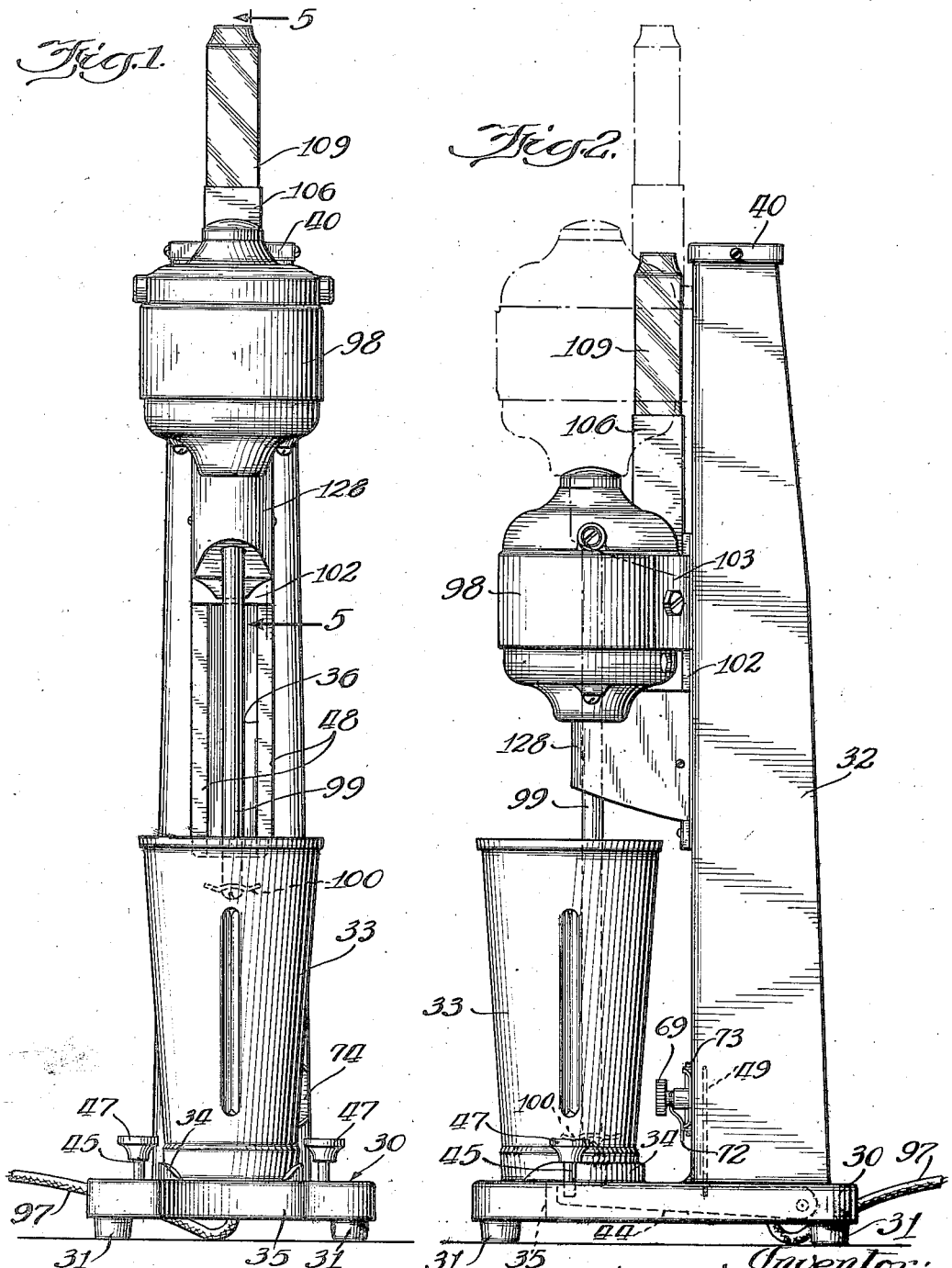

Inventor:
William Luxmore
By Williams, Bradbury,
McCaleb & Hinkle Attys.

April 30, 1935. W. LUXMORE 1,999,542
DRINK MIXER
Filed Oct. 21, 1932 7 Sheets-Sheet 3
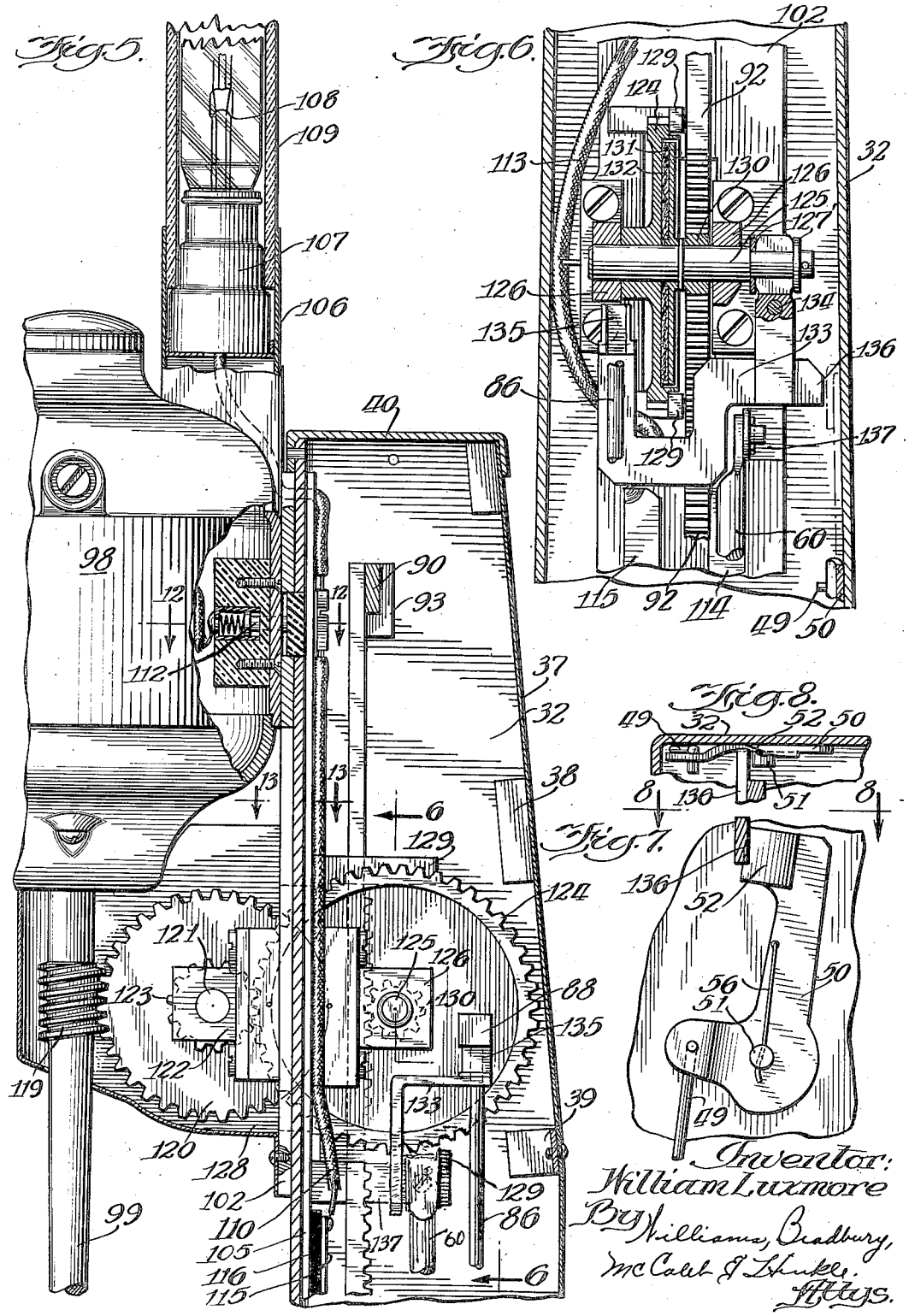
Inventor:
William Luxmore
By Williams, Bradbury,
McCaleb & Shukers
Attys.

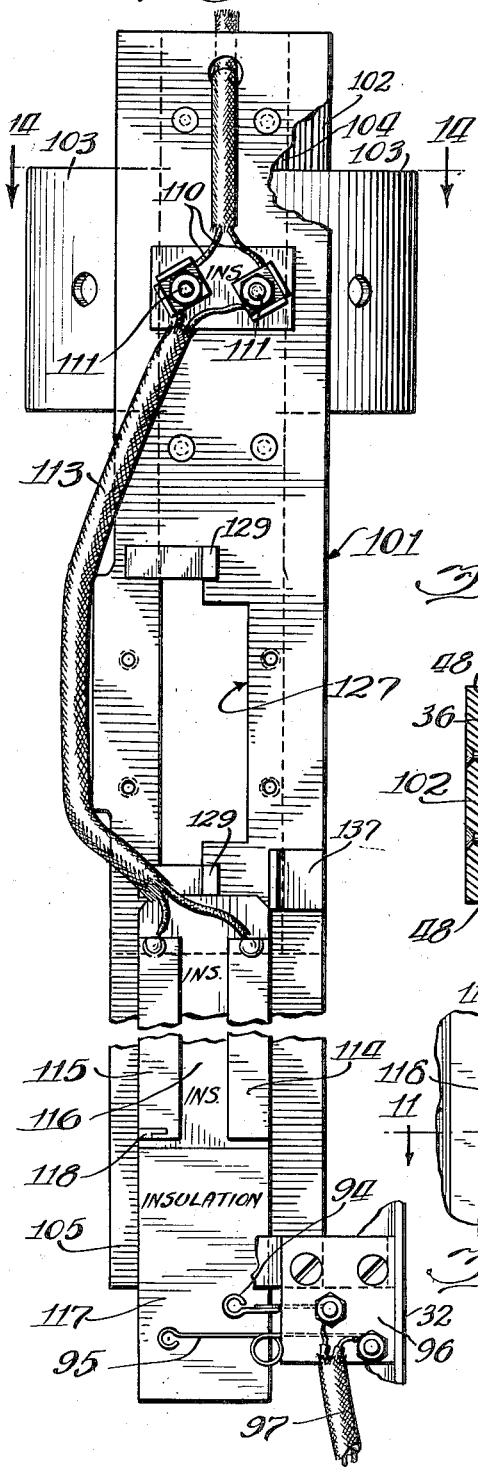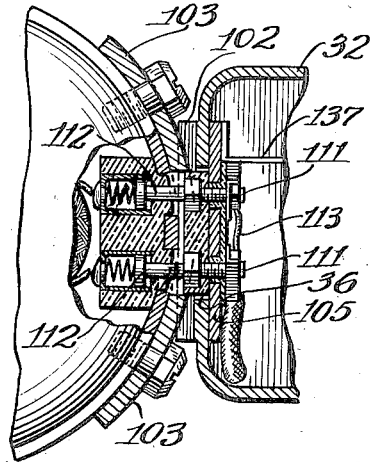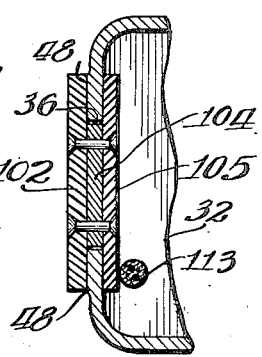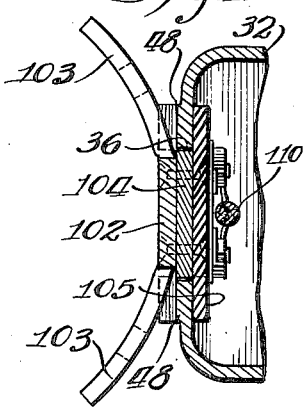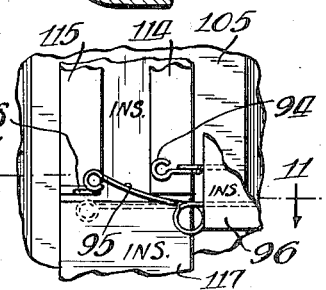

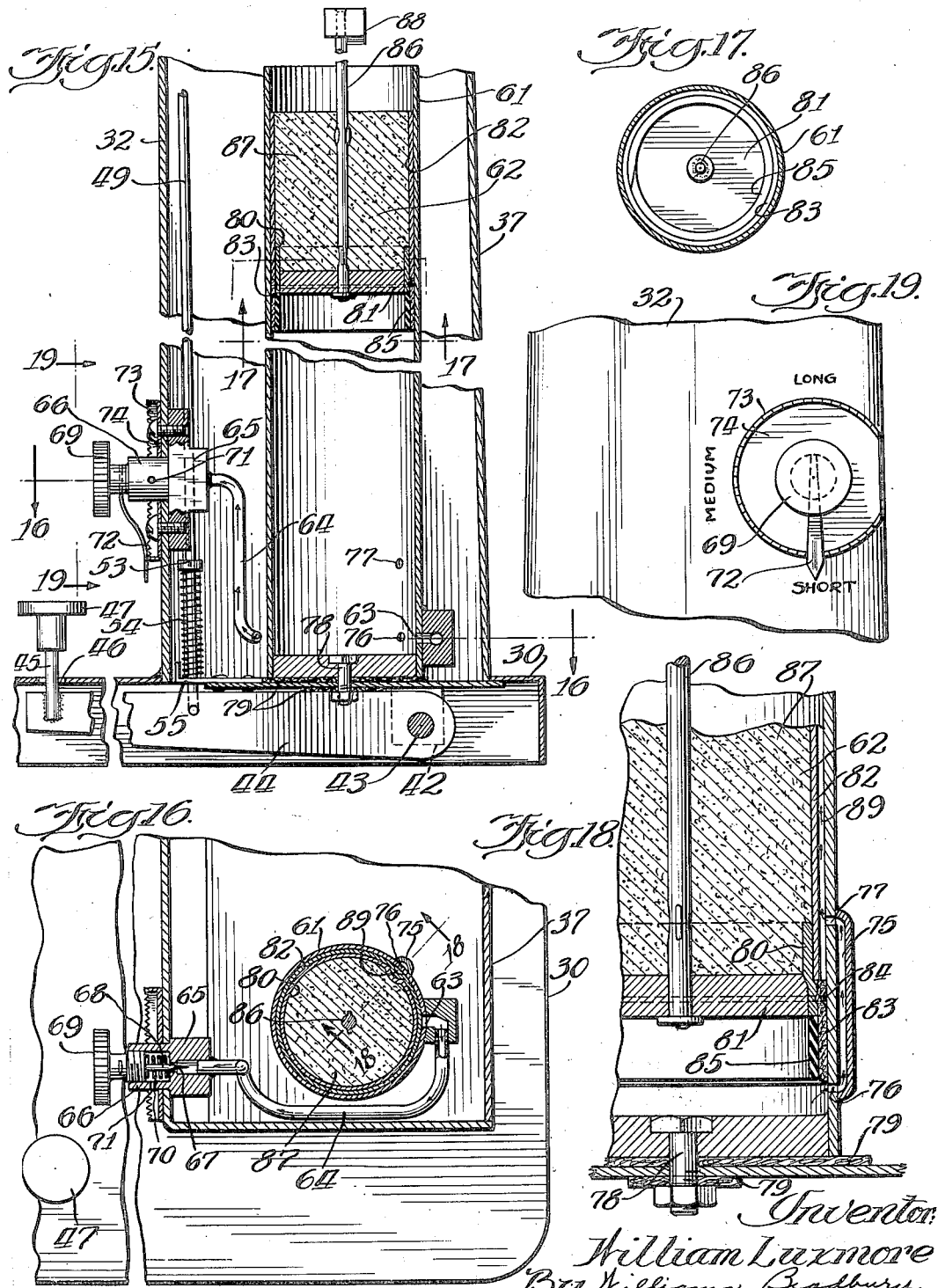

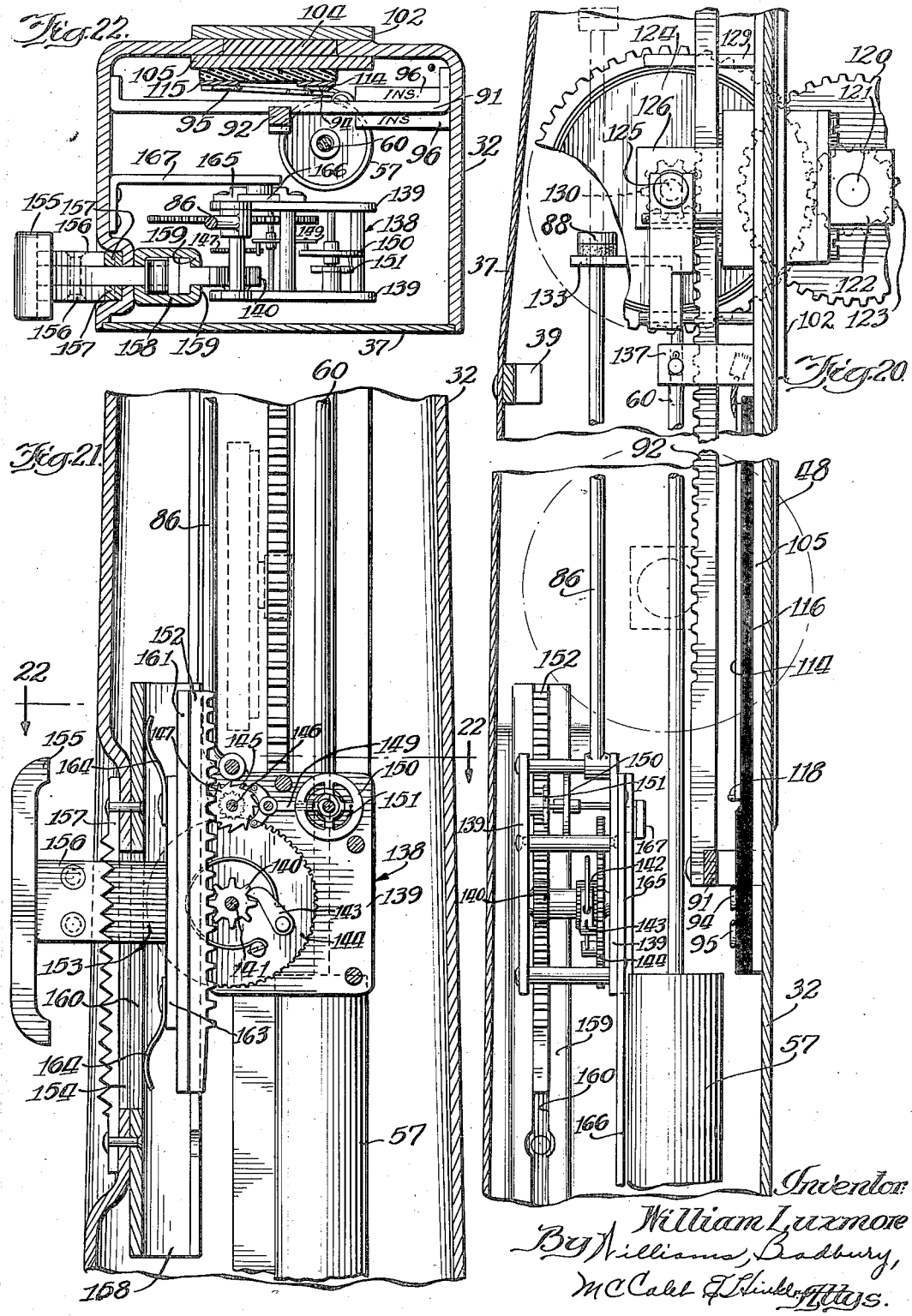

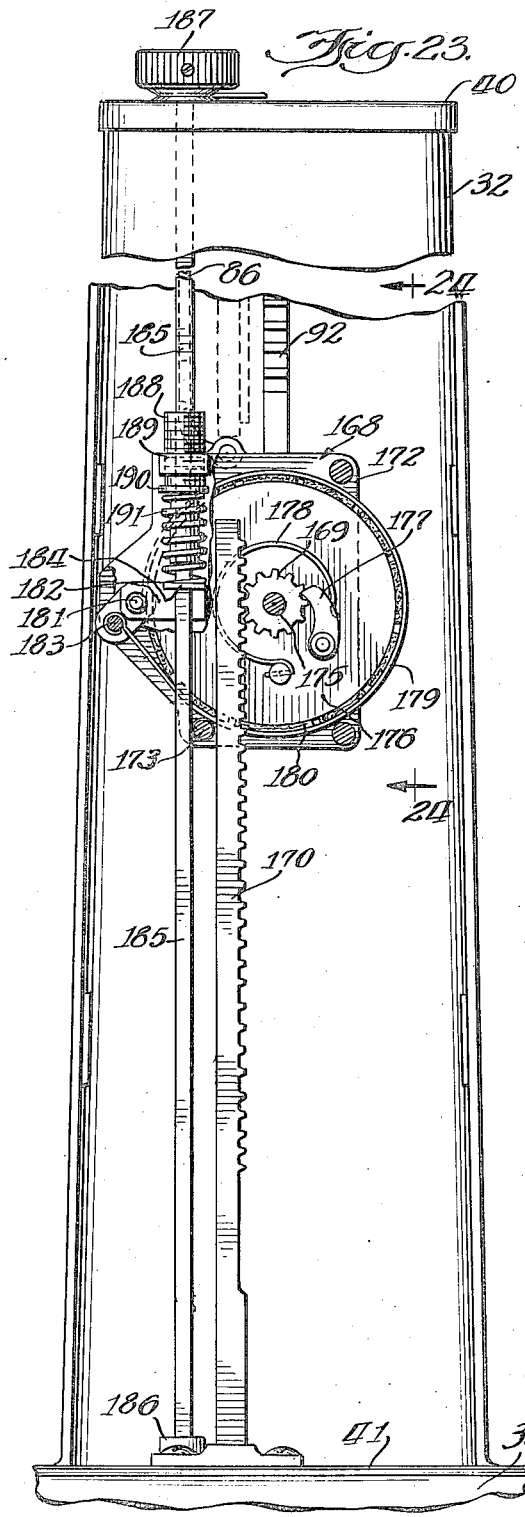
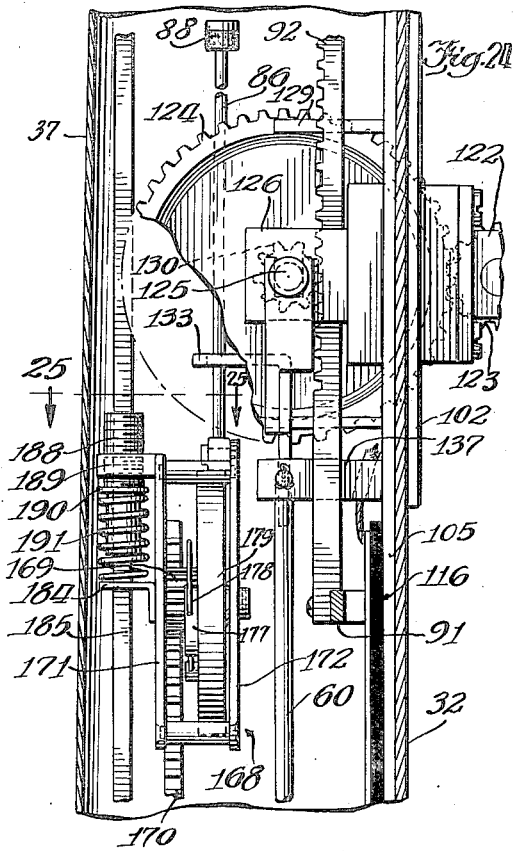
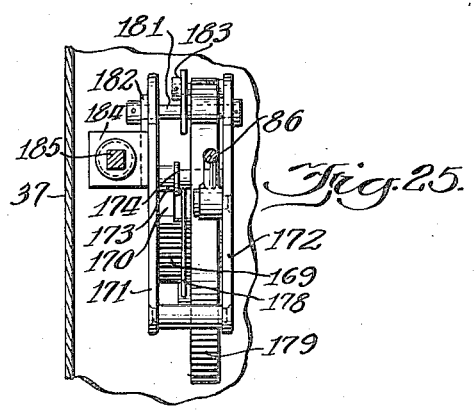

Patented Apr. 30, 1935

1,999,542

UNITED STATES PATENT OFFICE 1,999,542

DRINK MIXER

William Luxmore, Chicago, Ill., assignor of one-half to Albert G. McCaleb, Evanston, Ill.

Application October 21, 1932, Serial No. 638,844

12 Claims. (Cl. 259—99)

This invention relates to a drink mixer in which a motor driven stirrer is provided for the purpose of agitating the ingredients to blend same together.

One of the objects of the present invention is to provide a mixer in which the duration of the stirring or agitation is automatically controlled and terminated.

A further object of the invention is to provide a mixer of this type in which the duration of the stirring or agitation can be adjusted at will.

A further object of the invention is to provide a drink mixer in which the stirring mechanism is adapted to descend to bring the stirrer into the drink and is adapted to ascend again when the mixing is completed.

A further object of the invention is to provide a mixer having signal means for indicating termination of the stirring or agitation of the drink.

A further object of the invention is to provide an improved mixer which is adapted to be started manually in a convenient manner after the cup has been located upon the mixer.

Other objects, advantages, and capabilities of the invention will appear from the following description of preferred embodiments thereof, taken in conjunction with the accompanying drawings, of which there are seven sheets, and in which Figure 1 is a front elevation of a mixer embodying my invention in initial non-operative position;

Fig. 2 is a side elevation showing the mixer in operative position, the initial non-operative position being indicated in dash and dot lines;

Fig. 5 is a fragmentary side view of the upper portion of the mixer, partly in section, and on a larger scale, the section being taken on the line 5—5 of Fig. 1;

Fig. 6 is an elevational sectional detail view taken on the line 6—6 of Fig. 5, showing the clutch and motor elevating mechanism;

Fig. 7 is a fragmentary sectional elevation taken on the line 7—7 of Fig. 3;

Fig. 8 is a sectional plan detail view taken on the line 8—8 of Fig. 7;

Fig. 9 is an elevation of the sliding motor carriage removed from the mixer, together with stationary contact elements carried by the standard or the column;

Fig. 10 is an elevational detail view showing the manner by which a "quick break" is made by one of said contacts;

Fig. 11 is a sectional plan detail taken on the line 11—11 of Fig. 10;

Fig. 12 is a sectional detail taken on the line 12—12 of Fig. 5, showing the manner in which the motor is mounted on the carriage and contacts for the motor established;

Fig. 13 is a sectional plan detail taken on the line 13—13 of Fig. 5;

Fig. 14 is a sectional plan detail taken on the line 14—14 of Fig. 9;

Fig. 15 is a sectional detail view taken on the line 15—15 of Fig. 4, showing the time control mechanism of the mixer;

Fig. 16 is a sectional view taken on the line 16—16 of Fig. 15, showing the time-control mechanism;

Fig. 17 is an inverted plan detail view taken on the line 17—17 of Fig. 15;

Fig. 18 is a sectional detail taken on the line 18—18 of Fig. 16, on an enlarged scale;

Fig. 19 is a fragmentary elevation showing the time control knob looking in the direction indicated by the arrows 19—19 of Fig. 15;

Fig. 20 is an elevational section, showing the interior mechanism of another embodiment of the invention, in which the time of mixing is controlled by an escapement mechanism;

Fig. 21 is a fragmentary rear elevation thereof with part of the standard broken away;

Fig. 22 is a sectional plan view taken on the line 22—22 of Fig. 21;

Fig. 23 is a fragmentary rear view, with the rear cover partly broken away, of still another embodiment of the invention, in which the duration of agitation or stirring is controlled by means of an adjustable brake mechanism;

Fig. 24 is a vertical sectional detail taken on the line 24—24 of Fig. 23, and

Fig. 25 is a sectional plan detail taken on the line 25—25 of Fig. 24.

Figure 3:
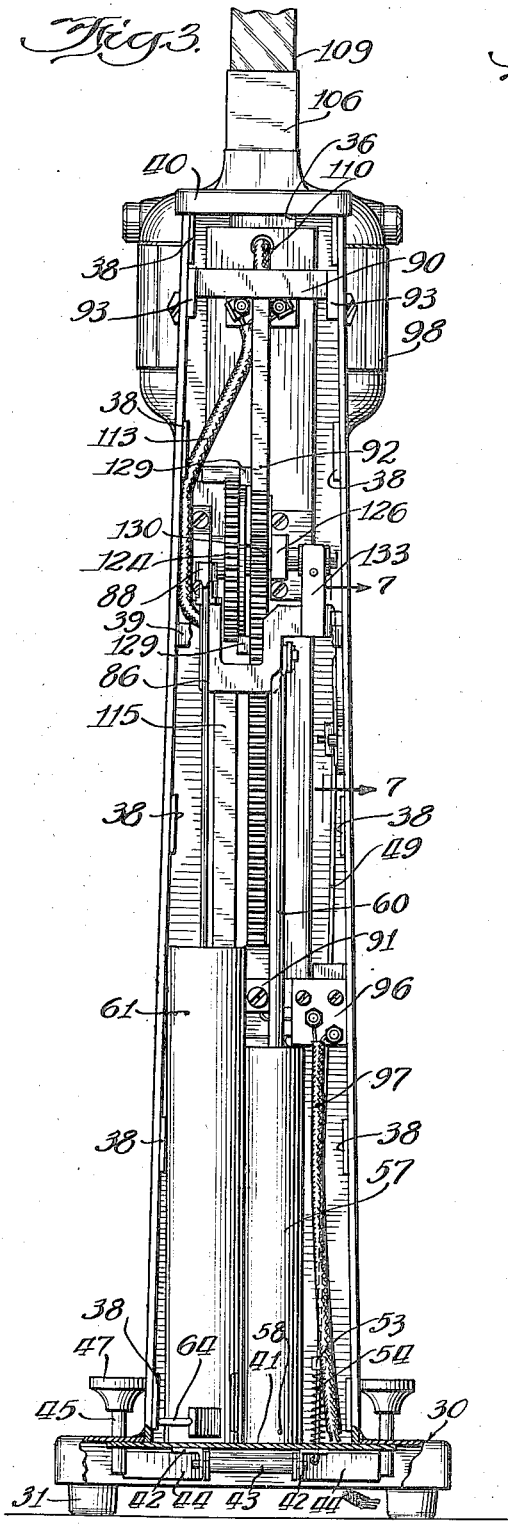
Fig. 3 is a rear elevational view of the mixer in initial non-operative position, the rear cover plate being removed to show the internal mechanism.
Figure 4:
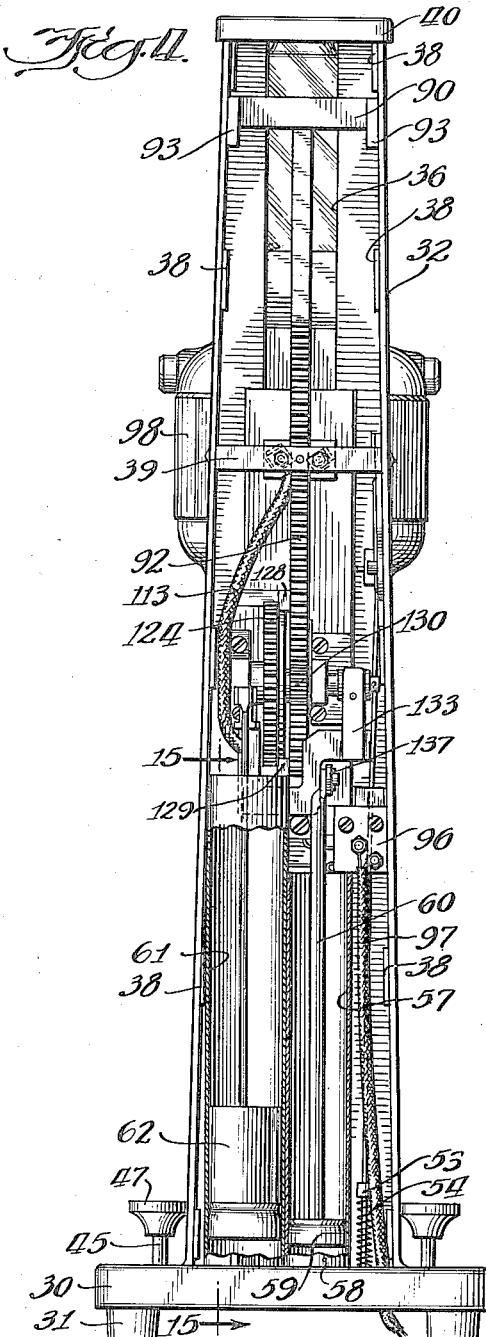
Fig. 4 is a similar view, showing the mixer in operative position towards the end of the stirring or agitation.

Referring to the drawings, and more particularly to Figs. 1 to 19 inclusive, the embodiment of the invention illustrated therein comprises a base 30 which may suitably be provided with a depending skirt, from which project feet 31 of rubber or other suitable material. The base 30 supports a vertical column or standard 32 which is hollow and serves as a housing for mechanism hereinafter described.

The column 32 is preferably located towards the rear of the base 30 so as to leave room for the usual cup 33 to be supported upon the front part of the base. The base is provided with an upwardly projecting flange 34 for holding the cup in proper position. The forward edge of the base 30 is recessed, as indicated at 35, so that the cup can more readily be introduced into, and removed from stirring position.

The column 32 is preferably rectangular in cross section and its front face, which is flat, is provided with a vertical slot 36. The rear face of the column 32 is closed by means of a removable panel 37 which engages suitable abutments 38 provided on the side walls of the column and is secured to bridge pieces 39 connecting said side walls, for example, by suitable screws. The upper end of the column is closed by a cap 40, also held in place by suitable screws. On each side of the slot 36 the face of the front wall of the column 32 is provided with a bearing strip 48 which is adapted to receive corresponding portions of the sliding carriage hereinafter described.

The lower end of the column 32 is bridged by means of a plate 41 secured to the under side of the base 30. The plate 41 carries angle irons 42 which provide support for a pivot 43 upon which is rigidly secured a pair of arms 44. These arms extend downwardly and forwardly, their forward ends being located on either side of, and in close proximity to the cup position as defined by the flange 34. These forward ends of the arms 44 carry pins 45 which project upwardly through openings 46 in the base 30. The pins 45 carry at their upper ends keys or buttons 47 so that one or the other can conveniently be pressed downwardly by hand when the cup has been or is being placed in operative position.

One of the arms 44 is pivotally connected to a rod 49 which extends upwardly through the column 32, its upper end being pivotally connected to a lever 50 (Fig. 7) mounted by a pivot 51 on one of the side walls of the column 32, at a suitable elevation. At its upper end the lever 50 is provided with a sloping cam surface 52, the purpose of which will hereinafter be described. The rod 49 rigidly carries a collar 53 (Figs. 3, 4 and especially 5) which provides an abutment for a coil spring 54, the lower end of which bears against a lug 55 carried by the plate 41 at the lower end of the column 32. The spring 54 tends to move the rod 49 upwardly, thus keeping the keys 47 normally in an elevated position. The spring 54 is assisted by a spring 56 associated with the lever 50 and its pivot 51 so as to tend to keep this lever in non-operative position, that is, the position shown in Figs. 7 and 8. With reference to Fig. 7, it will readily be understood that when either key 47 is depressed, the lever 50 rotates in counter-clockwise direction and the sloping surface 52 moves towards the left.

A dashpot cylinder 57 is rigidly mounted on the plate 41 and extends vertically within the column 32. Near its lower end the cylinder 57 is provided with a small orifice 58 which permits air to exhaust and enter as the piston 59 moves downwardly or upwardly. The piston 59 is connected to a piston rod 60 which is connected to the movable carriage hereinafter described. Alongside the dashpot cylinder 57 is another vertical cylinder 61 likewise supported on the plate 41 and likewise located within the column 32. The cylinder 61 operably receives a piston 62 which will hereinafter be more fully described. Adjacent its lower end the cylinder 61 communicates through an opening 63 with a conduit 64 (Figs. 3, 15 and 16) which connects with a fitting 65 rigidly mounted on the face of the column 32 and having a sleeve 66 projecting through an opening therein. The fitting 65 is provided at the inner end of the sleeve 66 with a metering orifice 67, the effective size of which is adapted to be controlled by means of a needle 68 carried by a button 69 which has a threaded mounting on the inside of the sleeve 66. A coil spring 70 is provided within the sleeve 66 which tends to move the button 69 and the needle 68 outwardly. The sleeve 66 is provided with an opening 71 to permit the passage of air which flows in either direction through the metering orifice 67. It will readily be understood that the adjustment of the needle 68 controls the effective size of the orifice 67 and thereby controls the rate of movement of the piston 62 in the downward direction.

In order to indicate the setting of the button 69, which controls the duration of the agitation or stirring performed by the mechanism, as will hereinafter be described, I prefer to provide the button 69 with a pointer 72. This pointer is preferably of resilient material and cooperates with notches in the outturned flange 73 of a circular plate 74 secured to the front of the column 32 around the sleeve 66. I also prefer to apply legends, as shown in Fig. 19, so as to indicate visually the setting of the mixer for short, medium and long stirring periods. Also adjacent its lower end the cylinder 61 is provided with a by-pass 75 which connects an opening 76 close to its bottom, with an opening 77 at a higher point. The purpose of this by-pass will be explained in conjunction with the description of the piston 62. As will hereinafter appear, the piston 62 and cylinder 61 have a time-controlling function, and in order to avoid irregularities in timing, due to communication of vibration from the motor to the cylinder 61, I prefer to mount this cylinder upon the plate 41 by means of a bolt 78, with the aid of suitable cushioning fabric 79, as shown in Fig. 18.

The piston 62 comprises a sleeve 80 into the lower end of which is pressed a stout plate 81. An elongated cylindrical shell 82 is pressed over the upper end of the sleeve 80 so that the exposed surface of the sleeve 80 is of reduced diameter so that a cup 83 of leather, or other suitable material, can be applied thereto, being secured in position by suitable means, for example, a wire 84. The cup 83 projects downwardly and is pressed against the wall of the cylinder 61 by means of a relatively heavy rubber ring 85, of appropriate dimensions. I have found that the ring 85 is remarkably efficacious for this purpose, forcing the cup 83 against the wall of the cylinder 61 in a highly satisfactory manner and producing a very effective seal.

A piston rod 86 is connected to the plate 81 and the whole piston is brought to a suitable weight for the exercise of its functions by means of a lead filling 87 poured into the sleeve 82. The piston rod 86 at its upper end carries a head 88, the lower surface of which is provided with a downward projection of V shape, the purpose of which will hereinafter be referred to. It is sufficient here to state that this shape of the head 88 maintains the piston 62 against rotation in the normal operation of the machine. The sleeve 82 is provided with a vertical channel 89 which communicates with the opening 77. This alignment is insured by the means for preventing rotation of the piston 62 referred to above. It will be noted that when the piston rod 86 is released, in the manner hereinafter to be described, the piston 62 will fall gradually, the rate of fall depending upon the setting of the button 69 and the needle 68. When, however, the channel 89 is brought into register with the opening 77, the air below the piston can pass freely through the by-pass and channel 89. Consequently, the descent of the piston 62 is accomplished in two stages, the first being a slow falling at a rate dependent upon the setting of the button 69, and the second being a relatively precipitate drop owing to the weight of the lead filling 87 and the relatively open passage for the escape of the air then enclosed below the piston 62. The advantageous result derived from this feature will hereinafter be explained.

Within the column 32 and at a slight distance from its front face, I provide a pair of transverse bridge members 90 and 91 upon which I mount a vertical rack 92, that is, a rack which is parallel to the front wall of the column 32. The teeth of the rack 92 are directed rearwardly, as shown in Fig. 5. In order to facilitate assembly I secure the bridge member 91 permanently to the side walls of the column. The upper bridge member 90 is supported by having its ends received in slots provided in small plates 93 soldered or otherwise secured to the inner faces of the sides of the column 32. The lower end of the rack 92 is secured to the bridge member 91 by means of a screw. The upper end of the rack is permanently secured to the bridge member 90. To install the rack it is merely necessary to pass the rack into position so as to bring the ends of the bridge member 90 into the slots referred to, and to secure the lower end of the rack to the bridge member 91. As will hereinafter appear, this is done with a certain relation to the parts of the movable carriage.

Electrical energy is supplied to the motor carriage by means of two spring contacts 94 and 95 (Figs. 10 and 11) which are supported by a piece of insulation 96 (Figs 3 and 4) carried by the bridge member 91. The contacts 94 and 95 will be described in greater detail in connection with their relation to the sliding carriage. They are electrically connected to the conductors of a cable 97 by means of which the mixer is connected to any suitable outlet.

The motor 98 drives the stirrer shaft 99 which is provided with a suitable stirring or agitating means 100 at its lower end. The shaft 99 extends downwardly from the motor and in the initial non-operative position the stirring means 100 is at an elevated point with respect to the base 30, so that the cup 33 may readily be slipped into position. The application of the cup to the base is facilitated by the depression or recess 35 in the front edge of the base 30.

The motor 98 is mounted on a carriage 101 shown in Fig. 9. This carriage comprises an outer plate 102 which is provided with integral wings 103 bent to conform to the shape of the motor, these wings being provided with openings whereby the motor is bolted thereto. Above and below these wings, the plate 102 is sufficiently wide to overlie the bearing strips 48 on the front face of the column 32. The plate 102 is connected by rivets or the like to plates 104 and 105. The plate 104 is substantially the same width as the slot 36 and is located therein in the assembled mixer. This plate is substantially the same length as the plate 102, said length being such that the necessary movement of this plate in the slot 36 may take place. Plate 105 is wider and longer so that it projects on either side beyond the plate 104 so as to provide a bearing surface engaging the rear face of the front plate of the column 32 on either side of slot 36. This plate is substantially longer than the plates 102 and 104, extending downwardly therebeyond so as to close the lower part of the slot 36 when the motor carriage is in its elevated position. It will readily be seen that the three plates 102, 104 and 105 assembled in this manner form a carriage which is adapted to slide upon the front wall of the column 32.

A housing 106 is secured to the plate 102 adjacent its upper end, this housing being adapted to overhang the motor 98. This housing contains a lamp holder 107 adapted to receive an incandescent lamp 108 of elongated type. This lamp is preferably enclosed within a translucent glass enclosure 109 of suitable decorative shape. As readily seen in Fig. 2, this enclosure and associated parts are adapted to clear the column during the normal movements of the motor carriage in the operation of the mixer. A cable 110 extends from the lamp holder through an opening in the plates 102, 104 and 105, its conductors being connected to two terminals 111 carried on and insulated from the three plates 102, 104 and 105. The heads of the terminals 111 are located on the outer face of the plate 102 between the wings 103. These terminals are connected to the motor by means of spring pressed studs 112 which are adapted to project outwardly from the motor and engage the heads of the terminals 111, as best shown in Fig. 12. A cable 113 connects the terminals 111 to two insulated metal strips 114 and 115 which are carried upon the plate 102, being mounted thereon by means of a strip of insulation 116. As best shown in Fig. 9, the spring pressed contacts 94 and 95 are adapted respectively to engage the strips 114 and 115. As shown in Fig. 9, the carriage 101 is in its elevated position and the strips 114 and 115 are elevated away from the contacts 94 and 95 which rest upon a further strip 117 of insulating material which lies substantially flush with the surface of the strips 114 and 115. The contacts 94 and 95 are made of springy material and are adapted to bear firmly against the surfaces of the strips 114 and 115.

The contact 94 is provided with a coil or convolution in a plane at right angles to the plane of the strip 114. The contact 95 is provided with a coil or convolution in a plane parallel to the strip 115, in order to render it resilient in this direction. At its lower end the strip 115 is provided with a projection 118 which is adapted to engage the end of the contact 95 and trip same, which in the upward movement of the carriage results in a quick break of the electric circuit which includes the motor 98 and lamp 108.

Adjacent the motor 98, the stirrer shaft 99 is provided with a worm 119 which cooperates with a gear 120 rigidly mounted on a shaft 121 supported on bearings 122 upon the front plate 102 of the carriage 101. The shaft 121 rigidly carries a smaller gear 123 which meshes with a larger gear 124 freely mounted on a shaft 125 which is capable of a limited longitudinal movement in bearings 126, which are mounted on the rear side of the carriage 101. The carriage is provided with a suitable opening 127, best shown in Fig. 9, to accommodate the gears 120 and 124. The gears 120, 123 and worm 119 are enclosed within a housing 128 located below the motor 98 and secured to the motor carriage 101 by suitable screws. This housing is provided with an opening through which the stirrer shaft 99 extends freely.

The carriage 101, on its rear side, carries guides 129 which engage the edge of the gear 124 so as to limit its axial movement upon the shaft 125. A pinion 130 is rigidly mounted on the shaft 125, for example by means of a pin. This pinion 130 is adapted to cooperate with the rack 92, as best seen in Fig. 3. A clutch plate 131 integral with the pinion 130 and rigid with the shaft, is located adjacent one face of the gear 124.

The clutch plate 131 is covered by a suitable material 132 so that it can operatively engage the face of the gear 124 so that power may be communicated from the latter to the pinion 130 when the shaft 125 is moved so as to engage the clutch plate 131 and the gear 124. A lever 133 is pivotally mounted on the carriage at 134 adjacent one end of the shaft 125. This end of the shaft is reduced and provided with rigid abutments 127' which are engaged by the bifurcated end of the lever 133. The lever 133 is of the irregular shape shown in Fig. 6, for the purpose of clearing the gear 124 and associated parts. Its remote end is provided with a rearwardly directed bifurcated end 135 which is substantially above the center of the cylinder 61. This bifurcated end is adapted to receive the head 88 of the piston 62 previously described. It will readily be understood that when the weight of this piston is exerted upon the lever 133, the clutch plate 131 is strongly pressed towards the gear 124 so that a frictional driving connection is established between these elements. The lever 133 carries a projection 136 which, in the clutched position of the lever 133, lies in the path of the cam 52, as best seen in Figs. 7 and 8. When the cam 52 is displaced from its normal or initial position by operation of either of the keys 47, it engages the projection 136 and moves the plate 131 into unclutched position. The piston rod 60 is connected to the carriage 101 by means of a lug 137 carried by the latter.

The device above described can very readily be assembled, the carriage and parts mounted thereon being assembled as a unit. The carriage is placed in position together with the rack 92, the carriage being slid downwardly with the plate 102 inside the slot 36. In this way the bridge element 90 is slipped into its sockets and the lower end of the rack 92 is secured to the bridge member 91 in the manner described above. The piston 62 is inserted in its cylinder 61 and the head 88 is brought into engagement with the bifurcated end of the lever 133. The piston rod 60 is secured to the carriage 101, the back plate 37 is placed in position and finally the cap 40 is applied.

The operation of the mixer is as follows. Assuming the mixer to be in the position shown in Fig. 1, that is, its normal or initial position, the cable 97 being plugged into a suitable outlet, the button 69 is turned to give the desired duration of stirring and the cup 33 is brought into its position on the base 30. Either of the keys 47 is now pressed downwardly by hand which has the effect of actuating the lever 50, bringing the cam 52 into engagement with the projection 136 of the lever 133. This lever has been held strongly in clutching position by the weight of the piston 62. This weight is now relieved and the piston 62 is raised slightly by reason of the pressure of the cam 52 upon the projection 136. Consequently, friction engagement between the clutch plate 131 and the gear 124 is broken so that the whole carriage, and mechanisms supported thereon, is free to fall downwardly, bringing the stirrer into operative position near the bottom of the cup 33, and preferably at a distance offset from the center of said cup. This downward movement is rendered gradual by the dashpot cylinder and piston 57 and 59, the air contained within the cylinder being expelled through the opening 58.

In the course of its downward movement the projection 136 of the lever 133 moves down below the cam 52, but owing to the fact that the lever 133 moves away from the head 88, the clutch remains non-operative during the subsequent mixing. The piston 62 descends gradually within its cylinder 61, the rate of fall depending upon the setting of the button 69. When the opening 77 comes into communication with the channel 89, the piston 62 falls more rapidly until the head 88 reaches the bifurcated end of the lever 133, rendering the clutch operative. When the carriage 101 has descended a certain amount, the contacts 94 and 95 come into engagement with the strips 114, 115 so that the motor starts and the lamp 108 is lighted.

The rotating stirrer, which has entered the drink in the cup 33 in the course of the descent of the motor carriage, continues its stirring or agitation until the head 88 engages the clutch in the manner just described. The effect of the engagement of the clutch is to drive the pinion 130 from the motor 98 through the worm 119, gears 120, 123 and 124, this driving causing the carriage to climb upwardly to its elevated position. When the carriage has ascended to a certain extent the projection 118 of the strip 115 engages the contact 95 and pulls the same upwardly into the position shown in Fig. 10. Immediately thereafter the contact 95 springs into the dotted-line position shown in this figure and a quick break of the motor and light circuits is effected. The momentum of the motor armature and associated parts is sufficient to continue the upward movement of the carriage, this movement being finally arrested by the engagement of the carriage with the cap 40.

The engagement of the V-shaped portion of the head 88 with the bifurcated end of the lever 133 maintains the vertical channel 89 of the piston 62 in alignment with the opening 77 of the cylinder 61.

In the embodiment of the invention illustrated in Figs. 20, 21 and 22, the base, column and carriage are substantially similar and the similar parts are designated by the same reference numerals as are used in the foregoing description. In this embodiment an escapement control timing device is employed instead of the cylinder 61 and associated time-control elements of the embodiment described above. Timing mechanism, which is designated by the reference numeral 138, is suspended by the rod 86 which carries the head 88 at its upper end, said head cooperating with the bifurcated end of the lever 133 in the same manner as in the previously described embodiment of the invention. The timing mechanism 138 comprises plates 139 riveted together in spaced relationship, the rod 86 being secured to one of the rivets. The plates 139 provide bearings for the elements which will now be described.

A pinion 140 is rigidly mounted upon a shaft 141. Also rigidly mounted on this shaft is a ratchet wheel 142 which cooperates with a spring pressed pawl 143 which is pivotally mounted on a gear 144. The gear 144 is freely mounted on the shaft 141 and is located alongside the ratchet wheel 142 so that the pawl 143 engages the ratchet wheel to connect the gear 144 rigidly to the shaft 141 when the same is being turned in the clockwise direction, as viewed in Fig. 21, the pawl 143 slipping over the teeth of the ratchet wheel 142 when the shaft 141 is turned in counter-clockwise direction. The gear 144 meshes with a small gear 145 rigidly carried on a shaft 146 which also carries an escapement wheel 147. The escapement wheel is adapted to cooperate with pallets of a pallet lever 149 in the usual manner to oscillate a balance wheel 150, the oscillation of which is controlled by a hair spring 151.

The pinion 140 meshes with a rack 152 which is adjustably mounted at a desired position so as to control the duration of the stirring or agitation of the drink. This rack carries an arm 153 which extends outwardly through a slot 154 in the side of the housing. At its outer end the arm 153 carries a handle 155 whereby it can be manipulated. The exposed portion of the arm 153 carries on each side a plate 156 having an inner serrated edge which is adapted to engage a rack 157 of similar contour secured to the side wall of the column 32 on each side of the slot 154. As shown in Fig. 21, this side wall is dished in the neighborhood of the slot 154 so that the racks 157 are sunk below the general surface of the side wall.

A channel member 158 having inturned flanges 159 is secured to said side wall and is provided in its central web with a slot 160 in alignment with the slot 154. The rack 152 is carried by a plate 161, whose edges project on either side beyond the sides of the rack 152. These projecting portions of the plate 162 engage the inner sides of the flange 159. The arm 153 is secured to a plate 163 secured to the back of the plate 161. The plate 163 carries at each end a spring 164 adapted to bear against the central web of the channel 158 so as to force the edges of the plate 161 firmly against the flanges 159 of the channel 158, and thereby maintain the rack 152 in correct operative relationship with the pinion 140. The pitch of the serrations of the racks 157 is the same as the pitch of the rack 152 so that the rack may be pulled away from the pinion 140 and moved longitudinally to a desired position. When the handle 155 is released, the springs 164 will force the rack 152 towards the pinion 140 and on account of the similarity of pitch between the racks 157 and 152, the latter will be presented to the pinion 140 in meshing relation.

The timing mechanism 138 is guided for vertical movement, for example, it may be provided with brackets 165 which overlie a vertical guide bar 166 which is supported on the column 32 in suitable manner, for example by means of brackets 167.

The operation of this embodiment is as follows. The rack 152 is first adjusted to a desired position, depending upon the duration of stirring or agitation which is desired. The motor carriage 101 is now released and descends gradually so as to bring the stirrer into the cup. This release of the motor carriage is effected by depressing either of the keys 47. While the downward movement of the carriage is retarded by the dashpot 57, this descent takes the lever 133 away from the head 88 of the rod 86. The weight of the timing mechanism 138 is supported by the lever 133 when the mechanism is in its initial non-operative position. Immediately the downward movement of the motor carriage 101 starts, the weight of the timing mechanism 138 tends to move said mechanism downwardly, causing the shaft 141 to be rotated by the pinion 140.

The rotation of the shaft 141 in the clockwise direction, as viewed in Fig. 21, causes the escapement wheel 147 to rotate in the counter-clockwise direction, this rotation being controlled by the pallet lever 149 and the balance wheel 150, in known manner. The result is that the descent of the timing mechanism 138 is relatively slow. When the pinion 140 comes to the lower end of the rack 152, the timing mechanism 138 falls rapidly and the head 88 of the rod 86 is brought into contact with the forked end of the lever 133, causing the gear 124 to be clutched to the pinion 130, the actuation of said pinion from the motor 98 causing the motor carriage to rise upwardly as previously described.

When the motor carriage has ascended to a certain position the electric circuit is broken in the same manner as described in connection with the previously described embodiment of the invention. During the ascent of the carriage 101 the pinion 140 again comes in contact with the rack 152 and the shaft 141 and ratchet wheel 142 are thereby rotated in the counter-clockwise direction, as viewed in Fig. 21. The pawl 143 permits this rotation without any effect upon the escapement mechanism. It will readily be understood that the duration of the stirring or agitation depends upon the effective amount of the rack 152 which is located below the initial position of the pinion 140. From the above description it will readily be seen that the adjustment of the rack 152 upwardly or downwardly, in the manner described above, will enable the operator to control exactly the duration of stirring or agitation.

In the embodiment of the invention illustrated in Figs. 23, 24 and 25, a further form of time-controlling device is employed, the remainder of the machine being substantially similar to that of the embodiments already described. In this embodiment the rod 86 is connected to a frame 168 which carries a rotatably mounted pinion 169 adapted to cooperate with a vertical rack 170 rigidly mounted on the plate 41. The frame 168 comprises a pair of plates 171 and 172 connected together in spaced relation by suitable rivets. One of these rivets 173 is adapted to bear against the rear face of the rack 170 and is provided with a shoulder 174 which is adapted to engage one side of the rack, the other side of the rack being adapted to bear against the inner face of the plate 171. This construction aids in guiding the frame 168 during its vertical movement. The pinion 169 is mounted on a shaft 175 against a brake drum 176 also mounted on the shaft 175, the pinion 169 and drum 176 being adapted to independent movement. A pawl 177 is pivotally mounted on one side of the drum 176 and is adapted to engage the teeth of the pinion 169 being pressed thereagainst by means of a spring 178. The pawl 177 is such that it operatively connects the pinion 169 and drum 176 when the pinion is rotated in the clockwise direction as viewed in Fig. 23, and permits free rotation of the pinion 169 in the opposite direction.

The drum 176 carries a brake band 179 which is adapted to apply a regulable friction upon the brake drum by means of a suitable brake lining 180. One end of the brake band 179 is rigidly secured to a pin 181 which is fixed upon the frame 168 and serves as a fulcrum for a lever 182. One end of this lever carries a pin 183 to which the other end of the brake band is secured. The other end of the lever 182 is bent into a horizontal plane, as shown at 184. The bent end 184 is provided with an opening through which passes freely a rod 185 of square or other non-round cross-section. This rod has a bearing 186 on the plate 141 and a second bearing in the cap or cover 40. At its outer end it carries an actuating button 187 whereby it may be adjusted to control the duration of the stirring or agitation.

The rod 185 passes freely through a threaded member 188 which has an opening of similar cross-section to that of the rod 185 so that they turn together when the button is rotated. The threaded member 188 has a threaded engagement in a bracket 189 carried by the frame 186. Below the threaded member 188 the rod 185 carries a washer 190. Between this washer and the bent end 184 of the lever 182 is provided a coil spring 191.

It will readily be understood that by rotating the button 187 the tension on the spring 191 is increased or decreased, and the tension of the brake band 179 upon the drum 176 is correspondingly increased or decreased. The tension of the brank band is thus controlled from the exterior and enables the rate of falling of the frame 168, after the motor carriage is released in the manner above described, to be adjusted as desired. The frame 168 is guided by the rack 170 and the rod 185. When it has descended to a considerable extent, the pinion 169 arrives at a point where the rack has no more teeth and the frame 168 moves downwardly at an increased rate, thus bringing the head 88 of the rod 86 into collision with the forked end of the lever 133, thereby clutching the pinion 124 to the plate 131 and effecting the elevation of the motor carriage and the termination of the stirring in the manner described previously.

The location of the keys 47 with respect to the cup 33, when the latter is in operating position, is an important feature of the present invention. The said keys are located closely adjacent to the downwardly tapering cup and well below that area of the outer surface of the cup (the area midway between top and bottom) which is grasped by the operator in manipulating the cup onto and off of its support. Therefore, in the act of placing the cup on its support, the lower edge of the operator's hand directly overlies one or the other of said keys,—depending on whether the operator is right handed or left handed.

As soon as the operator releases his grasp on the cup, the lower edge of his hand, naturally and without any additional volitional act on his part, gravitates against the button which it directly overlies,—thereby initiating the operation of the mixer. Thus, according to my present invention, the engagement of a starting key immediately and naturally follows the relaxing of the operator's grasp on the cup after placement of the latter on its support. The cup, preferably tapering downwardly as illustrated, guides the gravitation of the hand onto the key.

The embodiments of my invention which are herein exhibited, being intended for use by either right handed or left handed operators standing directly in front of the mixers, have two keys located laterally of the cup. It is not imperative that more than one key 47 be employed, nor is it imperative that the key be disposed laterally of the cup. The essential requirement is that the key be located closely adjacent the bottom of the cup so that the operator's hand, with the cup as a guide, will gravitate against the key as the natural result of the relaxing of the grasp of the hand upon the cup.

It will thus be seen that I have provided a drink mixer in which the operation can be started manually in a very convenient manner and which can be set to give the desired duration of mixing. The manner in which the stirrer moves downwardly at the beginning of the operation, and moves upwardly at the end of the operation, render it very easy to place the cup in position.

It will be understood that immediately the motor starts the lamp is lighted. At the end of the time period for which the device is set, the carriage moves upwardly, the motor stops and the lamp is extinguished. The lamp serves as a signal drawing attention to the fact that the stirring operation is completed and the drink is ready to be served.

Although the invention has been disclosed in connection with the specific details of preferred embodiments thereof, it must be understood that such details are not intended to be limitative of the invention except in so far as set forth in the accompanying claims.

Having thus described my invention, what I claim as new and desire to secure by Letters Patent of the United States is:

1. A drink mixer comprising a standard, a motor carriage mounted on the standard and arranged to drop along the standard when released at an elevated position on the latter, a motor mounted on the carriage, a depending agitator carried and driven by the motor, manually releasable means for unlatching the carriage in the elevated position aforesaid, elevating devices arranged to be driven by the motor adapted when actuated to raise the carriage to its elevated position aforesaid, and timing devices, functioning pursuant to the falling of the carriage, arranged to place said elevating devices in driven relation to the motor after the motor and agitator have operated for a predetermined interval in their fallen positions.

2. A drink mixer comprising a standard, a motor carriage mounted on the standard for vertical movement thereon, a motor carried by and movable with the carriage, a depending agitator carried and driven by the motor, a manually releasable latch for holding the carriage at an elevated position on the standard, and means operated by the falling of said carriage, pursuant to the releasing of said latch, for starting the motor.

3. A drink mixer comprising a standard, a motor support mounted on the standard and arranged to drop along the standard when released at an elevated position on the latter, a motor mounted on said support, a depending agitator carried and driven by the motor, a stationary cup support at the lower portion of the standard, manually releasable means for latching the motor support in the elevated position aforesaid, elevating devices arranged to be driven by the motor and adapted when actuated to raise the motor support to its elevated position aforesaid, contacts arranged and adapted to complete the motor circuit when said motor support drops toward the cup support and adapted to break the motor circuit when said motor support moves upwardly away from the cup support, and regulable timing devices, functioning pursuant to the falling of the motor support, arranged to place said elevating devices in driven relation to the motor after the motor and agitator have operated for a predetermined interval in their fallen positions.

4. A drink mixer comprising a standard, a motor slidably mounted on the standard for vertical movement thereon, an agitator carried and driven by the motor, motor elevating devices normally out of driven relation to the motor but arranged to be placed in driven relation to the motor to raise the latter on the standard, a releasable detent adapted to retain the motor at an elevated position on the standard when driven to such elevated position by its own power, a clutch adapted when operated to place said motor elevating devices in driven relation to the motor, and time-keeping mechanism, placed in operation by the falling of the motor pursuant to the release of said detent, for operating said clutch to place the motor elevating devices in driven relation to the motor pursuant to operation of the motor in its fallen position for a predetermined time interval.

5. A drink mixer comprising a stationary standard, a motor slidably mounted on said standard for vertical movement thereon, an agitator carried and driven by the motor, motor elevating devices arranged to be placed in driven relation to the motor to raise the motor on the standard, a clutch adapted when operated to place said motor elevating devices in driven relation to the motor, a releasable detent arranged to retain the motor at an elevated position on the standard when the motor is driven to said elevated position by its own power, time-keeping mechanism, placed in operation by the falling of the motor pursuant to the release of said detent, for operating said clutch to place the motor elevating devices in driven relation to the motor, means for disengaging the clutch when the motor has been driven by its own power to the elevated position aforesaid, and circuit controlling devices adapted to close the motor circuit during the falling of the motor and to open the motor circuit near the end of upward travel of the motor on the standard.

6. In a drink mixer, a standard, a motor carried by the standard, an agitator carried and driven by the motor, time-keeping mechanism comprising a member arranged when released to fall from a relatively elevated position with respect to the standard, devices forming part of said time-keeping mechanism for determining the descent period of said member, instrumentalities carried by the standard and engaged by said member to accomplish the stopping of the motor after said member has descended to a certain point relative to the standard, devices for elevating said member, devices for retaining said member in elevated position preliminary to renewed operation of the motor, and devices for releasing said member and starting the motor.

7. A drink mixer comprising a standard, a motor carried by the standard, an agitator driven by the motor, time-keeping mechanism comprising a member adapted to fall with respect to the standard, devices for accomplishing the opening of the motor circuit after said member has descended to a predetermined position relative to the standard, elevating devices adapted to raise said member, by the power of the motor, when said elevating devices are placed in driven relation to the motor, devices actuated by said member in its descent for placing said elevating devices in driven relation to the motor, a releasable detent for retaining said member at an elevated position to which it is driven by the power of the motor, and regulable means for determining the descent period of said member.

8. In a drink mixer, a standard, a motor mounted on the standard for vertical movement thereon, an agitator driven by the motor, a rack on the standard, a pinion driven by the motor, said pinion cooperating with the rack to elevate the motor on the standard when the motor is in operation and to hold the motor at an elevated position on the standard when the motor is not operating, a clutch interposed between said motor and said pinion, means for declutching the pinion from the motor to permit the descent of the motor from the elevated position aforesaid, circuit controlling devices for closing the motor circuit in the descent of the motor, time-keeping mechanism placed in operation by the descent of the motor, and instrumentalities operated by said time-keeping mechanism for engaging said clutch to permit the motor to drive itself to the elevated position aforesaid, through said pinion and rack, after the motor has operated for a predetermined time interval in its fallen position.

9. A drink mixer comprising a column, a motor carried by the column, a depending agitator driven by the motor, a cup, a support whereon the cup may be deposited and positioned beneath the agitator, devices for effecting relative vertical to and fro movement between the support and the agitator to enable the latter to enter and operate in and recede from said cup, and a manually operable device moving in a generally downward direction for initiating entry of the agitator into the cup, said device comprising a hand-engaging surface which is located near the bottom of the cup, and beneath the hand of the operator, when the cup is being deposited on the support, so that the hand of the operator, guided by the cup side wall, naturally gravitates into contact with said surface when the grasp of the hand on the cup is released following deposit of the cup on the support.

10. In a drink mixer, a standard, a motor supported by the standard, a depending agitator driven by the motor, a support whereon a cup may be placed to have its contents acted upon by said agitator, a downwardly tapering cup, and a downwardly moving manually operable device for initiating the operation of the mixer, said manually operable device comprising a hand-engaging surface which lies closely adjacent to the bottom of the downwardly tapering cup and beneath the lower edge of an operator's hand in the act of depositing the cup on said support, whereby the operator's hand, guided by the downwardly tapering side wall of the cup, may gravitate into engagement with said surface when the grasp of the operator's hand upon the cup is relaxed.

11. A drink mixer comprising a base, a column extending upwardly from said base, a motor mounted on said column, a depending agitator carried by said motor, means for supporting a cup beneath the agitator, said motor and supporting means being relatively movable one toward the other to place the agitator into the cup, and vertically movable manually actuated means disposed in a vertical plane closely adjacent the cup and beneath the position assumed by the operator's hand in placing the cup on the supporting means and arranged to be engaged by and actuated by the dropping of the hand which places the cup upon the supporting means, said manually actuated means initiating the entry of agitator into the cup and the starting of the motor.

12. A drink mixer comprising a standard, a motor supported by the standard, an agitator driven by the motor, a cup, a cup support whereon the cup may be placed to have its contents acted upon by said agitator, and a manually operable starting device for initiating the operation of the mixer, said starting device comprising a downwardly moving portion presenting a hand engaging surface disposed closely adjacent the periphery of the cup and below its mid position and beneath the lower edge of the operator's hand when depositing the cup on said support, whereby the operator's hand may gravitate into actuating engagement with said surface when the grasp of the operator's hand upon the cup is relaxed.

WILLIAM LUXMORE.